United States Patent
Barratt et al.

(10) Patent No.: US 7,336,626 B1
(45) Date of Patent: Feb. 26, 2008

(54) OPERATING TIME DIVISION DUPLEX (TDD) WIRELESS SYSTEMS IN PAIRED SPECTRUM (FDD) ALLOCATIONS

(75) Inventors: Craig H. Barratt, San Jose, CA (US); Christopher R. Uhlik, San Jose, CA (US)

(73) Assignee: Arraycomm, Inc, San Jose, CA (US)

( * ) Notice: Subject to any disclaimer, the term of this patent is extended or adjusted under 35 U.S.C. 154(b) by 952 days.

(21) Appl. No.: 09/967,637

(22) Filed: Sep. 28, 2001

(51) Int. Cl.
 *H04J 1/16* (2006.01)
(52) U.S. Cl. .................................................... 370/281
(58) Field of Classification Search ............... 370/280, 370/281, 294, 295, 330
See application file for complete search history.

(56) References Cited

U.S. PATENT DOCUMENTS 5,933,421 A * 8/1999 Alamouti et al. ........... 370/330

2004/0072579 A1 * 4/2004 Hottinen ................... 455/456.1

OTHER PUBLICATIONS

Catreux, S. et al., 'Capacity and Performance of Multiple-Input Multiple-Output Wireless Systems in a Cellular Context', 1999 IEEE Pacific Rim Conference, pp. 516-519.*

* cited by examiner

*Primary Examiner*—Melvin Marcelo
(74) *Attorney, Agent, or Firm*—Blakely, Sokoloff, Taylor and Zafman

(57) ABSTRACT

A wireless communication system operates in a combined FDD and TDD mode. During a first time period, data may be transmitted at a first frequency band and received at a second frequency band. During a second time period, data is transmitted at the second frequency band and received at the first frequency band. The first and second time periods may be of identical durations, thereby creating a 50% duty cycle. When the base station operates with multiple frequency bands, spatial processing parameters such as the spatial signature or copy weights of the mobile stations may be collected in all frequency bands, thereby allowing the full processing advantage of adaptive antenna.

25 Claims, 4 Drawing Sheets

Multi-Input, Multi-Output (MIMO) spatial processing facilitated by using TDD reception information carried forward to the transmission period on the same frequency.

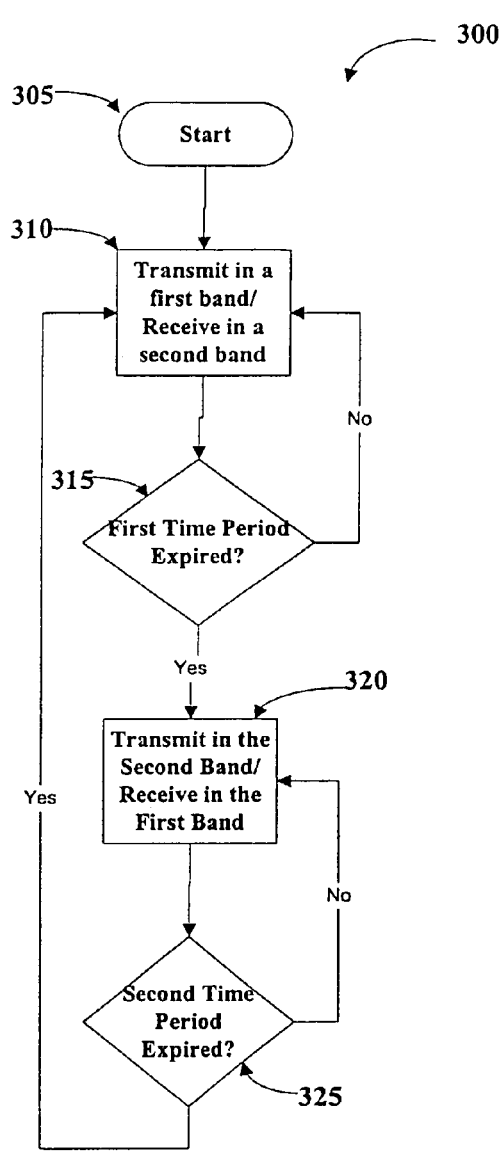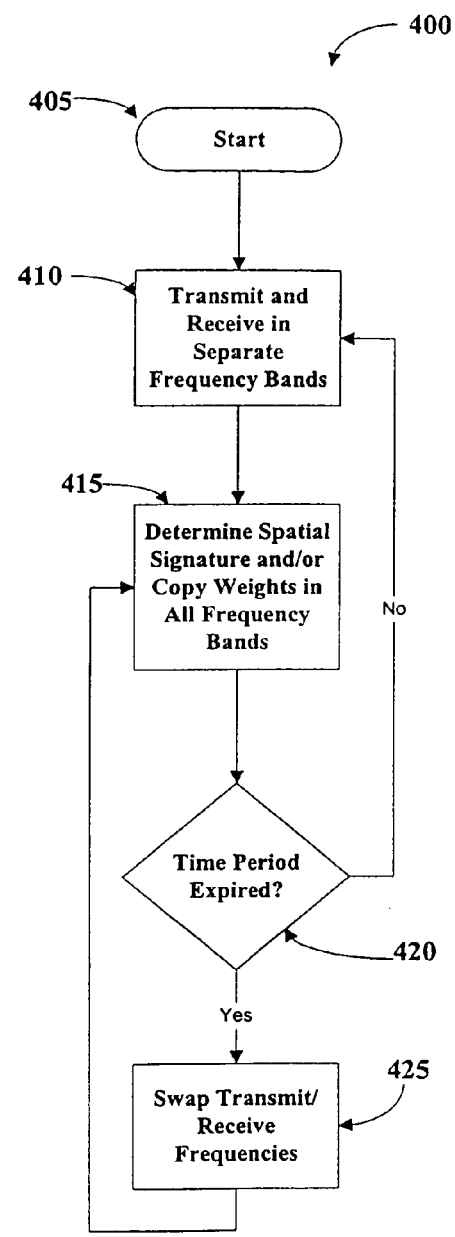
Figure 3
Figure 4

OPERATING TIME DIVISION DUPLEX (TDD) WIRELESS SYSTEMS IN PAIRED SPECTRUM (FDD) ALLOCATIONS

TECHNICAL FIELD

This application relates to wireless communication systems, and more particularly to combining time division duplex systems with frequency division duplex systems.

BACKGROUND

The use of wireless communication systems is growing with users now numbering well into the millions. One of the most popular wireless communications systems is the cellular telephone system in which a mobile station (or handset) communicates with a base station. Cellular telephones allow a user to talk over the telephone without having to remain in a fixed location. This allows users to, for example, move freely about the community while talking on the phone.

Antenna arrays may be used in communications systems that transmit and/or receive radio frequency signals. Antenna arrays typically include a number of antennas that are spatially separated and may be employed in a number of different wireless applications including radio communications systems, cellular systems, television broadcasting, point to point systems, paging systems, medical applications or the like.

The use of antenna arrays in such systems provides antenna performance improvements over the use of a single element antenna. Such antenna performance improvements for received signals may include improved signal to noise ratio and interference rejection. Antenna performance improvements for transmitted signals may include improved gain, reduced interference, increased network, and lower transmit power requirements. Antenna arrays may be used for signal reception only, for signal transmission or for both signal reception and transmission.

A typical application of antenna array systems is in a wireless communication system. Examples include a cellular communication system and a wireless local loop system. Such wireless communications systems typically include one or more communications stations, generally called base stations, each communicating with subscriber units, also called remote terminals, mobile stations, and handsets. In cellular systems, the handset is typically mobile, while in wireless local loop systems; the handset is typically in a fixed location.

The antenna array is typically at the base station, but may also be employed at a user terminal. Communication from the mobile station to the base station is typically called the uplink and communication from the base station to the mobile station is typically called the downlink. In time division duplex (TDD) systems, uplink and downlink communications with a particular remote terminal occur at the same frequency, but at different time slots. In frequency division duplex (FDD) systems, uplink and downlink communications with a particular remote terminal occur at different frequencies and may or may not occur at the same time.

Since different frequencies are used in the uplink and downlink communication channels in FDD, the behavior of the signals in the uplink and downlink communication channels between the base station and remote terminal are different. The differences are more apparent as the channels have more multipath components. In a multipath environment, scattering and/or reflections caused by, for example, buildings, hills, trees, and the like result in amplitude and phase changes and/or multipath components in the communication signals. Multipath components behave differently for different frequencies and a communication signal arriving at an antenna array changes with the frequency. Accordingly, the optimal signal combining function at an adaptive antenna array based wireless communications system is itself a function of scatterers in the environment.

Another factor that impacts wireless communication system performance is the presence of multiple remote terminals utilizing the same frequency or channel at the same time in the environment. As the number of separate sources or remote terminals utilizing the same frequency increases, the amount of interference in the communications channel also increases.

Adaptive antenna array signal processing can dramatically reduce the amount and effects of communications channel interference. If the adaptive antenna system can account for all environmental scattering effects, the extent to which interference can be reduced is greatly improved. We propose a means by which an FDD system wherein frequency dependent scattering might otherwise limit the performance of interference suppression of an adaptive antenna array is operated in a combined FDD TDD mode. Operating in this combined mode allows the array signal processing system to overcome the limitations of FDD operation.

SUMMARY

A wireless communication system operates in a combined FDD and TDD mode. During a first time period, data may be transmitted at a first frequency band and received at a second frequency band—conventional FDD operation. During a second time period, data is transmitted at the second frequency band and received at the first frequency band—again conventional FDD operation, but in this second period the uplink/downlink roles of the frequency bands are reversed relative to the first period. The first and second time periods may be of identical durations, thereby creating a 50% duty cycle. When both the base station and the remote terminal operate with multiple frequency bands, spatial processing data such as the spatial signature (amplitude and phases of signals seen by each element of the antenna array) or complex array tap weights to optimally copy the signal received may be collected for all operating frequencies (e.g. both halves of an FDD channel pair), thereby allowing the full processing advantage of adaptive antenna arrays for all operating frequencies.

A further advantage of operating in this combined FDD/TDD mode is increased utilization of radio components relative to conventional TDD operation. In TDD operation, half of the radio system lies idle much of the time. While transmitting, typically the receiver lies idle. While receiving, the transmitter lies idle. In the proposed combined operating mode, both receiver and transmitter may be operated continuously taking fuller advantage of all radio hardware elements.

These and other features and advantages will be apparent upon reading the following detailed description and upon reference to the accompanying drawings.

DESCRIPTION OF DRAWINGS

FIG. 3 illustrates a process of operating a wireless communication system.

FIG. 4 illustrates a process of calibrating a wireless communication system.

DETAILED DESCRIPTION

Figure 1:
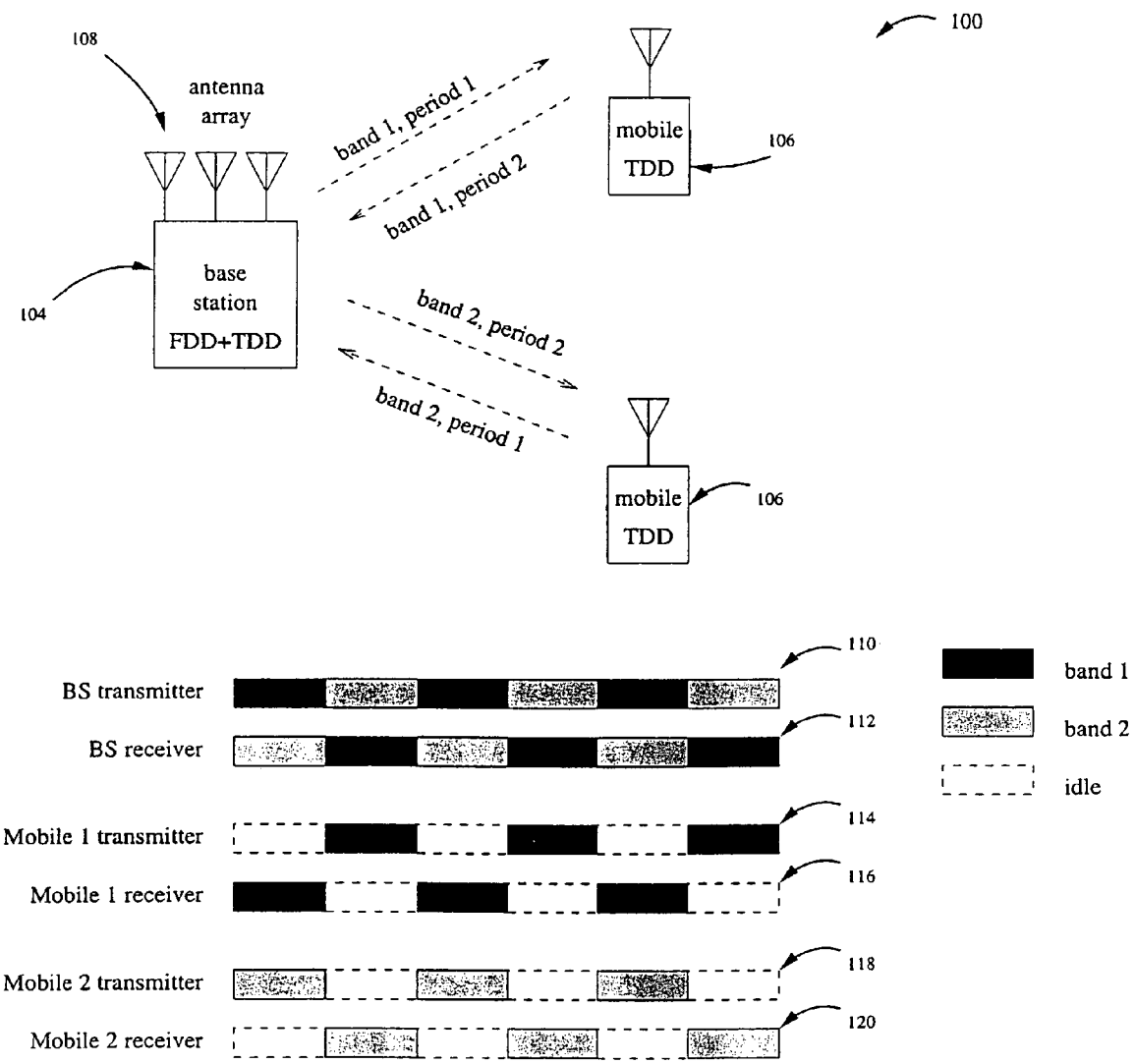
FIG. 1 illustrates components of a wireless communication system utilizing a combined FDD/TDD system.

FIG. 1 illustrates components of a wireless communication system 100 utilizing a combined FDD/TDD system. The wireless communication system 100 includes a base station 104 and one or more mobile stations 106. The base station 104 may use an antenna array 108. The base station 104 is capable of communicating with each of the mobile stations 106 by operating in a combined FDD/TDD mode. Each of the mobile stations 106 may be operating in the TDD mode. The base station 104 transmits during a first period in a first frequency band and receives during the same time period in a second frequency band. During a second time period, the base station switches and transmits in the second band and receives in the first band. The operation of the base station transmitter 110 and receiver 112 are graphically demonstrated.

The first mobile station 106 operated in TDD mode on the first frequency band. The mobile station receives in the first frequency band during the first time period and transmits in the first frequency band during the second time period. The operating of the mobile station transmitter 114 and receiver 116 are graphically demonstrated. The second mobile station 106 also operates in TDD mode, but on the second frequency band. The second mobile station 106 receives in the second frequency band during the first time period and transmits in the second frequency band during the second time period. The operating of the second mobile station transmitter 118 and receiver 120 are graphically demonstrated. Because the base station 104 operates in both the first frequency band and the second frequency band, the base station 104 can simultaneously communicate with both the first and second mobile stations 106. Because terminals in both frequency bands operate in a TDD mode, the base-station spatial processing system is able to take advantage of the reciprocity of the radio propagation environment in each band to derive downlink transmit weights from information received by the antenna array during the corresponding uplink periods. This technique enables large downlink interference suppression performance improvements.

Figure 2:
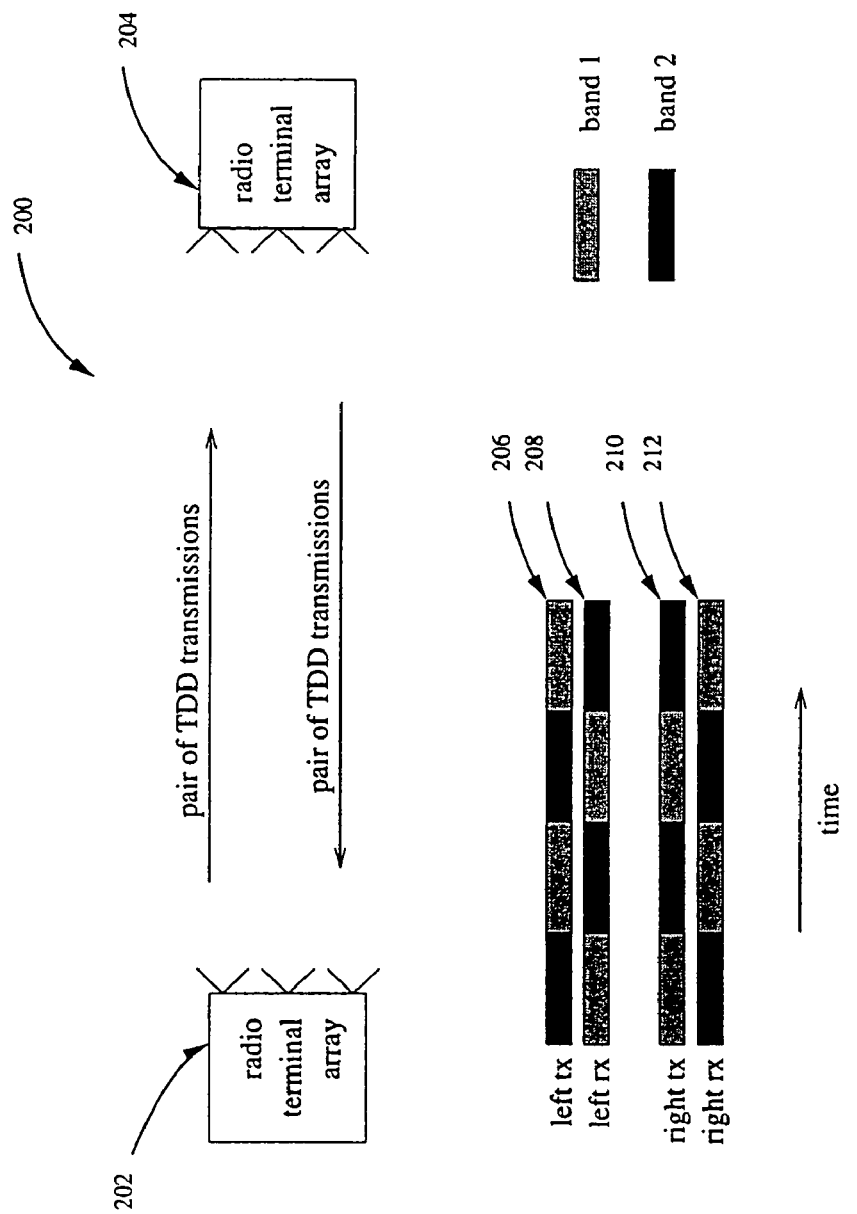
FIG. 2 illustrates a pair of terminals in a communication system communicating over a pair of frequency bands.

FIG. 2 illustrates a pair of terminals in a communication system 200 communicating over a pair of frequency bands. The first terminal 202 and the second terminal 204 both operate in a combined TDD/FDD mode. The first and second terminals 202, 204 may be, for example, point-to-point microwave data communications terminals linking two buildings, each having an adaptive antenna system. By operating in a combined TDD/FDD mode, the first and second terminals 202, 204 may continually transmit to and receive information from each other. The operation of the transmitter of the first terminal 202 is shown graphically 206. The first terminal transmits during a first time period in a second band, and then transmits during a second time period in a first band. The operation of the receiver of the first terminal 202 is shown graphically 208. The first terminal receives during a first time period in a first band, and then receives during a second time period in a second band. The transmitter and receiver of the second terminal operating in a similar manner, only reversing the frequency bands as shown in 210, 212.

FIG. 3 illustrates a process 300 of operating a wireless communication system in a combined TDD/FDD mode. The process 300 begins in START block 305. Proceeding to block 310, the base station 104 transmits in a first band and receives in a second band. The first and second band may be frequency bands corresponding to frequencies assigned for wireless communication for both uplink and downlink communication such as 1870-1875 MHz uplink and 1950-1965 MHz downlink, or other assigned frequencies. The specific frequency bands used are not critical and may vary depending on the wireless system in use, the country of use, or other variables. By transmitting in a first band while simultaneously receiving in a second band, the base station may communicate with multiple mobile stations 106 or provide full duplex communication with a single mobile station 106.

Proceeding to block 315, the process 300 determines if a first time period has expired. As in a time division duplex (TDD) system, the base station 104 transmits or receives during a set time period. The base station 104 transmits in the first band and receives in the second band during this first time period. If the time period has not expired, the process 300 proceeds along the NO branch back to block 310 to continue to transmit in the first band and receive in the second band. Once the first time period expires, the process 300 proceeds along the YES branch to block 320.

In block 320, the base station 104 switches and transmits in the second band and receives in the first band. Thus, if the base station 104 is communicating with a first mobile station 106 in the first band, the base station 104 will begin to receive information from that mobile station 106. Conversely, if the base station 104 is communicating with a second mobile station 106 in the second band, the base station 104 will begin to transmit information to the second mobile station 106. The base station 104 is able to use its transmit and receive hardware during both time periods, thus increasing the efficiency of the base station 104. Further, if the mobile station 106 is also capable of operating in both frequency bands, the base station 104 can send and receive information with and from the mobile station 106 at any time.

Proceeding to block 325, the process 300 determines if a second time period has expired. The second time period may be of the same duration as the first time period, thereby creating a 50% duty cycle of the base station 104. The durations of the first and second time periods may be adjusted to any lengths however, resulting in differing duty cycles. If the second time period has not expired, the process 300 proceeds along the NO branch back to block 320 to continue to transmit in the second band and receive in the first band. Once the second time period expires, the process 300 proceeds along the YES branch back to block 310 to repeat the cycle. The base station 104 may terminate the process 300 at any time if transmission or reception is no longer required.

While the words base-station and mobile station have been used to describe the two ends of the communications link, this is not meant to exclude peer-to-peer communications links. Such communication links can utilize FDD/TDD operating mode to facilitate bi-directional spatial processing while maximizing the utilization of radio components.

FIG. 4 illustrates a process 400 of calibrating a wireless communication system. The process 400 begins in a START block 405. Proceeding to block 410, both the base station 104 and the mobile station 106 simultaneously transmit and receive in separate frequency bands to maintain a full duplex communication link. The base station 104 and the mobile station 106 operate in opposite phase with each other. For example, if the base station 104 is transmitting in a first frequency band and receiving in a second frequency band, the mobile station 106 should transmit in the second frequency band and receive in the first frequency band. Proceeding to block 415, the base station 104 may determine the spatial signature, copy weights, other calibration data, or any combination thereof from signals received by the array from the mobile station 106 in the receive frequency band. Adaptive antenna arrays may provide large increases in capacity by increasing the uplink and downlink interference mitigation. An important point of this invention is that the base-station (i.e. the smarter side of the adaptive antenna signal processing system) uses the information during the receive period to characterize the communications channel of the frequency used to receive in that period. Said communications channel characteristics can then be carried forward into the next communications period in which the characteristics can be applied to optimizing the transmit antenna pattern. Likewise, in the second time period, when the frequency roles are reversed and reception is occurring in the second frequency band, the second frequency band can be characterized both for optimizing receptions in that band and for subsequent transmissions in the second frequency band. More details on the use of adaptive antenna arrays are well documented and will not be described in further detail herein.

This allows the base station 104 to properly optimize both reception to and transmission from the antenna array. Proceeding to block 420, the process 400 determines if the time period has expired. If the time period has not expired, the process 400 proceeds along the NO branch back to block 410 to continue to transmit and receive in the separate frequency bands. Once the time period expires, the process 400 proceeds along the YES branch to block 425.

In block 425, the process swaps the transmit and receive frequency bands for both the mobile station 106 and the base station 104. Thus, the base station 104 in the above example will switch to transmit in the second frequency band and receive in the first frequency band, while the mobile station 106 switches to transmit in the first frequency band and receive in the second frequency band. This allows the transmit and receive hardware of both the mobile station 106 and the base station 104 to operate at all times, thus increasing the efficiency of the wireless communication system.

After swapping the transmit and receive frequencies of both the mobile station 106 and the base station 104, the process 400 returns to block 415 to continue to collect the channel characterization data in all frequency bands. The process 400 continues in this loop, continually swapping the transmit and receive frequency bands until the process 400 is terminated. The second time period may be of the same duration as the first time period, resulting in a 50% duty cycle for both the base station 104 and the mobile station 106. The duration of the first or second time periods may be changed, thereby adjusting the duty cycles. By obtaining the mobile stations 106 spatial signature, copy weight, or other calibration data during both the uplink and downlink bands, the full processing advantage of adaptive antenna arrays in both the uplink and downlink band may be realized.

Figure 5:
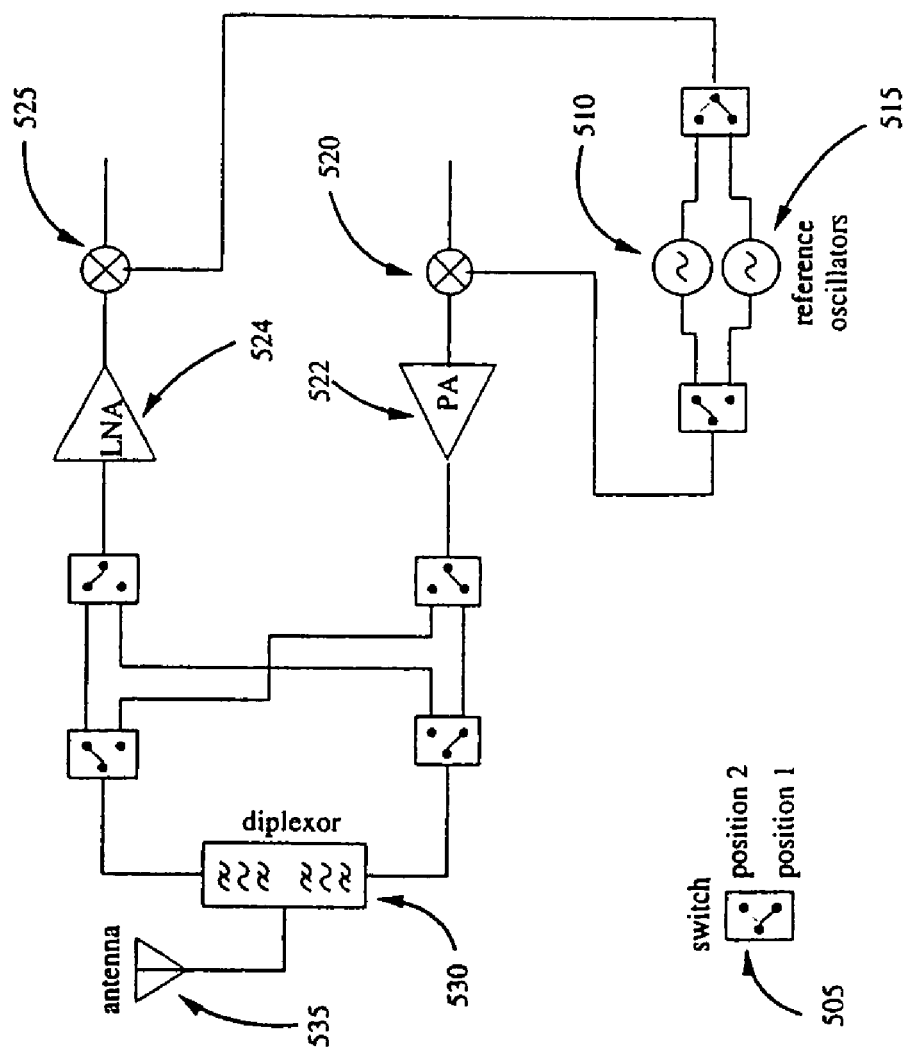
FIG. 5 is a circuit that may be used to operate the wireless communication system.

FIG. 5 is a circuit 500 that may be used to operate the wireless communication system. The circuit 500 may be used in the base station 104, the mobile station 106, or both. The circuit 500 allows for operation at two different frequencies during two different time frames. Thus, the circuit 500 allows the base station 104 or mobile station 106 to transmit and receive at different frequencies during different time periods. Although the circuit 500 represents one technique of operating with multiple frequencies, many different circuits may be developed to accomplish essentially the same result. The circuit 500 is shown and described by way of example.

The circuit 500 includes a plurality of switches 505, oscillators 510, 515, mixers 520, 525, amplifiers 522, 524, a diplexer 530, and an antenna 535. Each of the oscillators 510, 515 is tuned to a separate frequency, thus allowing transmission and reception a multiple frequencies. With the switches in a first position (position 1), the oscillator 510 is connected to the power amplifier 522 and the diplexer 530 and antenna, allowing transmission at the frequency of the oscillator 510. The received transmission is taken from the antenna 535 through the diplexer 530 through a low noise amplifier (LNA) 524 to be demodulated at the frequency of the oscillator 515. By changing the position of the switches 505 to the second position (position 2), the transmission occurs at the frequency of the second oscillator 515 and the demodulation of the received signal occurs at the frequency of the first oscillator 510. The processor 205 may control the switches to determine the timing of switching the transmit and receive frequencies.

Operating with two frequency bands or at two time periods is not required. If desired, any number of frequency bands with a corresponding number of time periods may be used. For example, a third frequency band may be used along with a third time period, allowing further flexibility for the wireless communication system. Any frequency hopping system wherein the uplink and downlink frequency bands are not disjoint could operate in this manner. Other embodiments are within the scope of the following claims.

What is claimed is:

1. A method of operating a wireless communication system, the method comprising:
   transmitting information from a wireless communications device during a first period in a first band;
   receiving information at the wireless communications device during the first period in a second band;
   transmitting information from the wireless communications device during a second period in the second band;
   receiving information at the wireless communications device during the second period in the first band; and
   determining at least one of a spatial signature or copy weights corresponding to the first and second bands from the received information in the first band and the second band.

2. The method of claim 1, wherein a combination of the first period and second period comprises a single cycle.

3. The method of claim 2, further comprising transmitting and receiving with a 50% duty cycle.

4. The method of claim 1, further comprising operating a mobile station in either the first band or the second band.

5. The method of claim 1, wherein the information is transmitted to and received from a first mobile station in the first band and a second mobile station in the second band.

6. The method of claim 1, further comprising:
   determining communication channel characteristics of the first band and the second band using at least one of the determined spatial signature or copy weights; and
   optimizing transmission and reception of information in the first band and the second band using the determined communication channel characteristics of the first band and the second band.

7. A method of obtaining spatial processing signal processing parameters in a wireless communication system, the method comprising:
   transmitting information from a first terminal and receiving at a second terminal during a first period in a first band;
   transmitting information from the second terminal and receiving at the first terminal during the first period in a second band;
   transmitting information from the first terminal and receiving at the second terminal during a second period in the second band;
   transmitting information from the second terminal and receiving at the first terminal during the second period in the first band; and
   determining the spatial signature or copy weights or both corresponding to both frequency bands of the second terminal from the received information in both the first band and the second band.

8. The method of claim 7, wherein transmitting from and receiving information at the first terminal comprises transmitting and receiving information via adaptive antenna arrays.

9. The method of claim 7, wherein a combination of the first period and second period comprises a single cycle.

10. The method of claim 9, further comprising transmitting and receiving with a 50% duty cycle.

11. The method of claim 8 wherein the first and second terminals are peers utilizing adaptive antenna systems at both ends.

12. A wireless communication system comprising a base station that transmits information in a first band and receives information in a second band during a first period and transmits information in the second band and receives information in the first band during the second period, wherein the system determines at least one of spatial signature or copy weights corresponding to the first and second bands from the received information in the first band and the second band.

13. The wireless communication system of claim 12, further comprising a first TDD terminal that transmits and receives either in the first band or in the second band.

14. The wireless communication system of claim 13, wherein the first period and the second period together comprise a complete cycle.

15. The wireless communication system of claim 14, wherein the first terminal transmits and receives at one of a 50% duty cycle or a subset of a 50% duty cycle.

16. The wireless communication system of claim 14, wherein communication channel characteristics of the first band and the second band are determined using at least one of the determined spatial signature or copy weights to optimize transmission and reception of information in the first band and the second band.

17. A wireless communication system comprising:
a first terminal that transmits in the second band and receives in the first band during a first period and transmits in the first band and receives in the second band during the second period; and
a second terminal that transmits in a first band and receives in a second band during a first period and transmits in the second band and receives in the first band during the second period, wherein the second terminal is configured to determine the spatial signature or copy weights or both of the first terminal in the first band and the second band.

18. The wireless communication system of claim 17, wherein the first period and the second period together comprise a complete cycle.

19. The wireless communication system of claim 18, wherein each of the first terminal and the second terminal operates with a 50% duty cycle.

20. The wireless communication system of claim 17, wherein the second terminal uses adaptive antenna arrays.

21. A method of facilitating wireless communication comprising:
establishing between a first terminal and a second terminal a communication link having at least two frequency channels;
controlling the two frequency channels such that
(i) a first frequency channel transmits data from the first terminal to the second terminal while a second frequency channel transmits data from the second terminal to the first terminal, and
(ii) the second frequency channel transmits data from the first terminal to the second terminal while the first frequency channel transmits data from the second terminal to the first terminal; and
determining at least one of the spatial signature or copy weights of the first terminal from the received data in the first frequency band and the second frequency band.

22. The method of claim 21, further comprising periodically exchanging roles between the first terminal and the second terminal.

23. The method of claim 21, further comprising transmitting and receiving at a 50% duty cycle.

24. The method of claim 21, wherein the second terminal is a mobile station in a wireless communication system.

25. The method of claim 21, further comprising:
determining frequency channel characteristics using at least one of the determined spatial signature or copy weights; and
optimizing transmission and reception of information in the two frequency channels using the determined frequency channel characteristics.

* * * * *